United States Patent
Ohtsu et al.

(10) Patent No.: US 6,290,289 B1
(45) Date of Patent: Sep. 18, 2001

(54) SUNROOF APPARATUS

(75) Inventors: Masanobu Ohtsu; Jun Takahashi, both of Kanagawa (JP)

(73) Assignee: Ohi Seisakusho Co., Ltd., Yokohama (JP)

( * ) Notice: Subject to any disclaimer, the term of this patent is extended or adjusted under 35 U.S.C. 154(b) by 0 days.

(21) Appl. No.: 09/568,247

(22) Filed: May 9, 2000

(30) Foreign Application Priority Data

May 26, 1999 (JP) .................................................. 11-146530

(51) Int. Cl.$^7$ ........................................................ B60J 7/05
(52) U.S. Cl. ............................ 296/221; 296/221; 296/224
(58) Field of Search ..................................... 296/221, 224

(56) References Cited

U.S. PATENT DOCUMENTS 4,877,285 * 10/1989 Huyer ................................ 296/224 X

FOREIGN PATENT DOCUMENTS

| 39 19 998 | 1/1991 | (DE) . | |
|---|---|---|---|
| 196 35 145 | 10/1997 | (DE) . | |
| 0403734 | * 3/1992 | (EP) | ..................................... 296/221 |
| 1-55124 | 11/1989 | (JP) . | |
| 404078721 | * 3/1992 | (JP) | ..................................... 296/221 |

* cited by examiner

Primary Examiner—Dennis H. Pedder
(74) Attorney, Agent, or Firm—Foley & Lardner

(57) ABSTRACT

When a lid is situated at its fully closing position, a guide pin of a drive shoe is contacted with the front end of a guide groove formed in a guide member. From this state, as a drive shoe is driven and rotated forwardly, the guide pin is moved backwardly from the front end of the guide groove, so that the lid can be moved to the fully closing position, tilt-up position and flap position sequentially in this order.

8 Claims, 5 Drawing Sheets

SUNROOF APPARATUS

BACKGROUND OF THE INVENTION

1. Field of the Invention

The present invention relates to a sunroof apparatus in which a lid for opening and closing an opening formed in the roof of a vehicle can be moved to a fully-closing position, a tilt-up position, and a flap position.

The present application is based on Japanese Patent Application No. Hei. 11-146530, which is incorporated herein by reference.

2. Description of the Related Art

As a conventional sunroof device, for example, there is known a sunroof device, which is disclosed in Japanese Patent Publication No. Hei. 1-55124.

In this apparatus, a lid for opening and closing an opening formed in the roof of a vehicle is connected to a drive source through a cable, and a moving shoe slidably fitted with a pair of guide rails respectively disposed on the two sides of the opening is slidably engaged with a guide slit formed in a guide block fixed to the lower surface of the lid. As the drive source rotates forwardly and reversely, the moving shoe is allowed to move within the guide slit, whereby the lid is able to move to a tilt-up position where the rear end of the lid is raised up from its fully closing position and a flap position where the rear end of the lid is lowered from the fully closing position.

However, in the above-mentioned conventional sunroof apparatus, when the lid is situated at the fully closing position, a guide pin is situated substantially at the center of the guide slit in the longitudinal direction thereof; and, in case where the guide pin moves forwardly from the position, the lid is allowed to move to the tilt-up position and, in case where the guide pin moves backwardly from the position, the lid is allowed to move to the flap position. Therefore, when the lid is situated at the fully closing position, the moving shoe is standing still substantially at the center of the guide slit. Due to this, a structure for controlling the play of the moving shoe in the back and forth direction is made complicated, which results in the expensive cost of the sunroof apparatus.

Also, in a sunroof apparatus of a power type in which a lid can be moved by a drive source such as a motor, a motor control circuit for stopping a moving shoe at its stop position is complicated, which results in the expensive cost of the sunroof apparatus.

SUMMARY OF THE INVENTION

The present invention aims at eliminating the drawbacks found in the above-mentioned conventional sunroof apparatus. Accordingly, it is an object of the invention to provide a sunroof apparatus which, when a lid is held in its fully closing position, prevents the play of the lid and a drive shoe by a simple structure to thereby be able not only to reduce the cost of the sunroof apparatus but also to stop the drive shoe at its stop state positively.

In attaining the above object, according to the invention, there is provided (1) a sunroof apparatus structured such that a drive shoe connected through a cable to a drive source is slidably fitted with a pair of guide rails respectively disposed on the two sides of an opening formed in a roof of a vehicle body, a guide pin provided on and projected from the drive shoe is movably engaged with a guide groove formed in a guide member disposed on the side a lid for opening and closing the opening and, as the drive source is operated, the drive shoe is moved along the guide rail and the guide pin is moved within the guide groove, whereby the lid can be moved to a fully closing position where the lid closes the opening, a tilt-up position where the rear end of the lid is raised upwardly of the surface of the vehicle body roof, and a flap position where the lid rear end is lowered downwardly of the roof surface, wherein, when the lid is situated at the fully closing position, the guide pin of the drive shoe is contacted with the front end of the guide groove and, from this state, as the drive source is driven and rotated forwardly, the guide pin is moved backwardly from the front end of the guide groove, whereby the lid can be moved sequentially to the fully closing position, tilt-up position and flap position in this order.

(2) In the sunroof apparatus as set forth in the above (1) aspect of the invention, the guide groove of the guide member includes a fully closing guide portion formed in the front portion of the guide groove and extending almost horizontally, a tilt-up guide portion formed continuously with rear end of the fully closing guide portion and facing downwardly in the backward direction of the guide groove, and a flap guide portion formed continuously with the rear end of the tilt-up guide portion and facing upwardly in the backward direction of the guide groove, while the rear end portion of the flap guide portion is positioned upwardly of the fully closing guide portion.

(3) In the sunroof apparatus as set forth in the above (1) or (2) aspect of the invention, in the intermediate portion of the guide member in the longitudinal direction thereof, there is disposed a stopper shoe which, when the lid is held in its fully closing state and tilt-up state, can be engaged with stopper grooves respectively formed in the guide rails and facing in the vertical direction to be thereby prevented from moving back and forth.

(4) In the sunroof apparatus as set forth in any one of the above aspects (1) to (3), in the rear of the drive shoe, there is disposed a vertically restricting shoe which is connected to the cable and are movably fitted with the guide rails, and also which, when the lid is held in the fully closing state, can be engaged with a rear guide shoe disposed in the rear portion of the guide member to thereby prevent the vertical movement of the lid.

Features and advantages of the invention will become understood from the following detailed description of the preferred embodiments described in conjunction with the attached drawings.

DETAILED DESCRIPTION OF THE PREFERRED EMBODIMENTS

Now, description will be given below of a preferred embodiment of a sunroof apparatus according to the invention with reference to the accompanying drawings.

Figure 8:
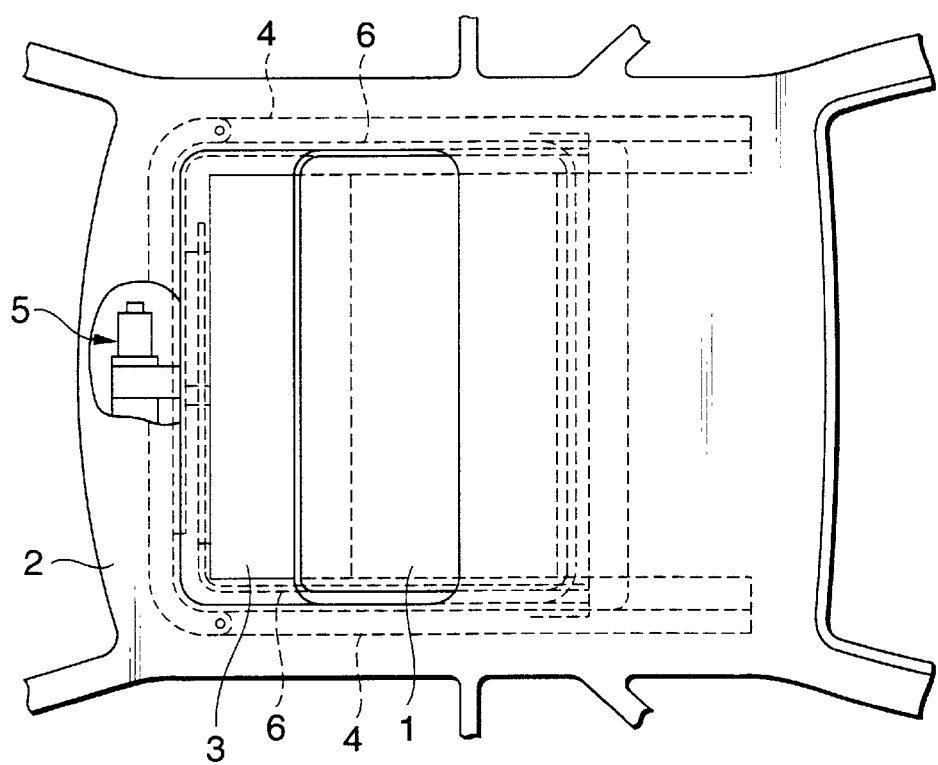
FIG. 8 is a plan view of a roof of a vehicle incorporating therein a sunroof apparatus according to the invention.

In FIG. 8, reference character (1) designates a lid which is supported that it can be moved back and forth along a pair of right and left guide rails (4) respectively so disposed on the two sides of an opening (3) formed in a roof (2) of a vehicle to extend in the longitudinal direction of the guide rails (4). The lid (1) can be moved to a fully closing position shown in FIG. 1 where it closes the opening (3), a tilt-up position shown in FIG. 2 where the rear end of the lid is raised up from the upper surface of the roof (2), and a flap position shown in FIG. 3 where the rear end of the lid is lowered down from the upper surface of the roof (2). And, in a state where the lid (1) is situated at the flap position, the lid (1) can be moved backwardly and stored into a storage portion located in the lower portion of the roof (2).

Reference character (5) designates a drive source including an output gear (not shown) and capable of outputting the rotation of a reversible motor in such a manner that the rotation of the motor is decreased, and (6) stands for two cables which are respectively disposed along their associated guide rails (4) and can be pushed and pulled; that is, the cables (6) can be engaged with the output gear of the drive source (5) to move within the guide rails (4) in the longitudinal direction thereof.

Figure 1:
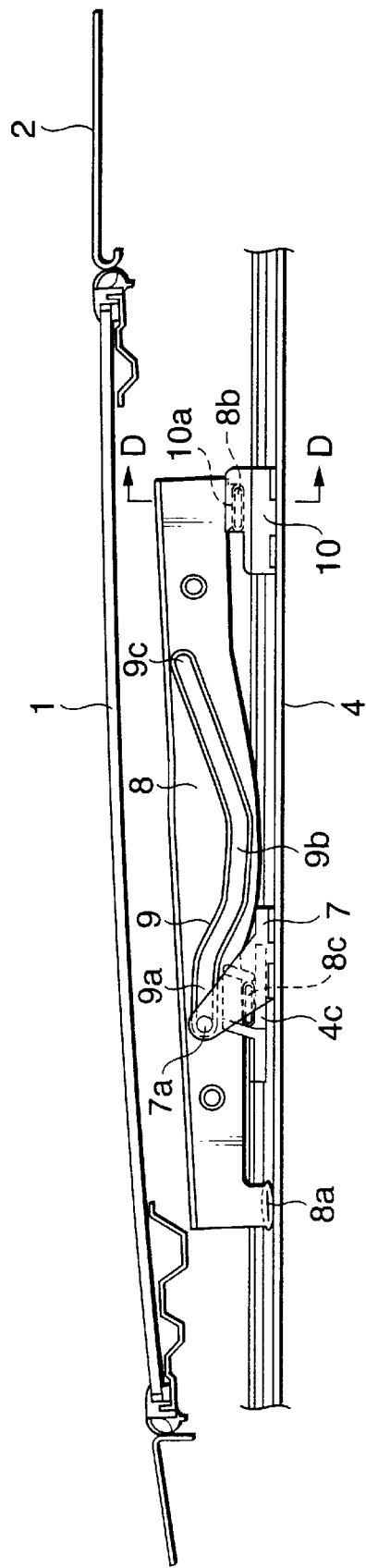
FIG. 1 is a partially longitudinal section view of a roof of a vehicle when a sunroof apparatus according to an embodiment of the invention is held in the fully closing state.
Figure 2:
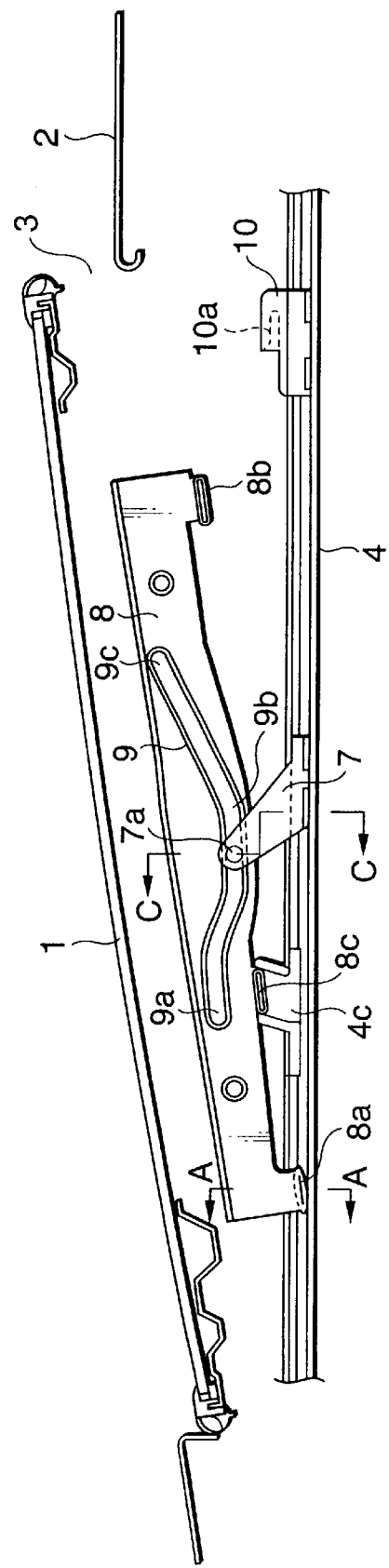
FIG. 2 is, similarly to FIG. 1, a partially longitudinal section view of the roof when the sunroof apparatus is held in the tilt-up state.
Figure 3:
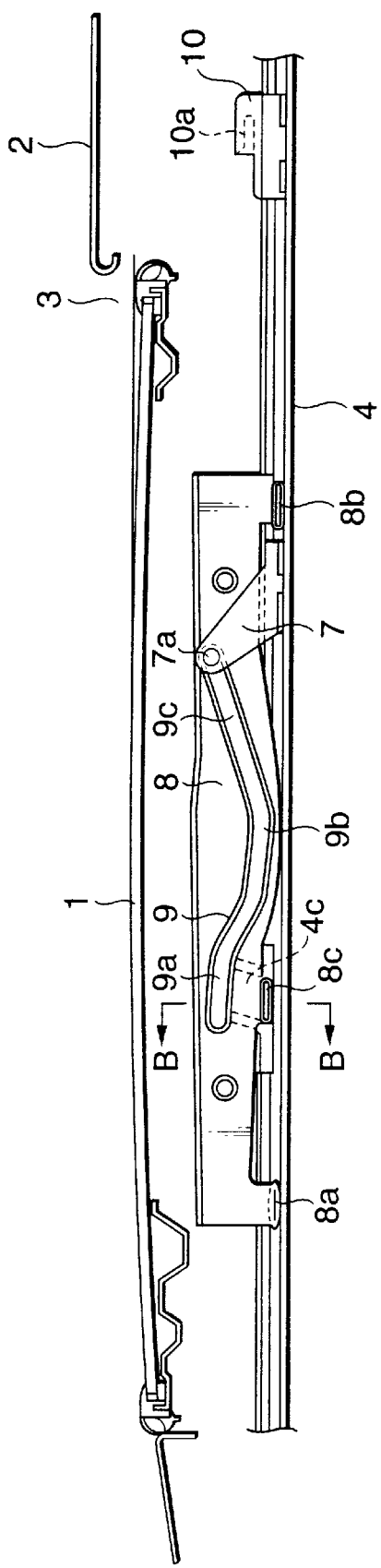
FIG. 3 is, similarly to FIG. 1, a partially longitudinal section view of the roof when the sunroof apparatus is held in the flap state.
Figure 4:
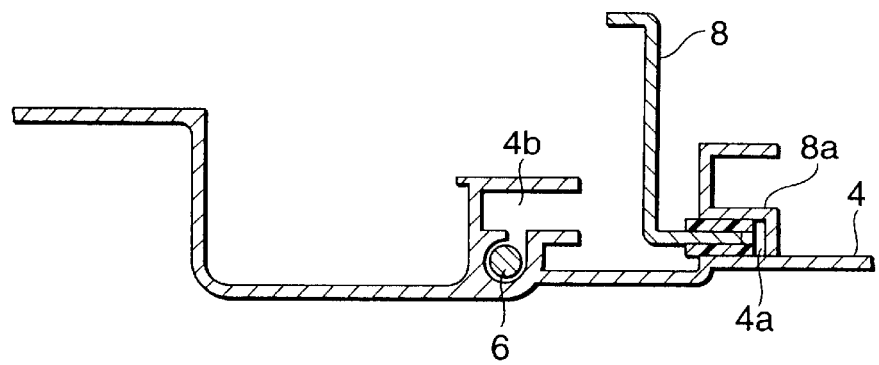
FIG. 4 is a section view taken along the line A—A shown in FIG. 2.
Figure 5:
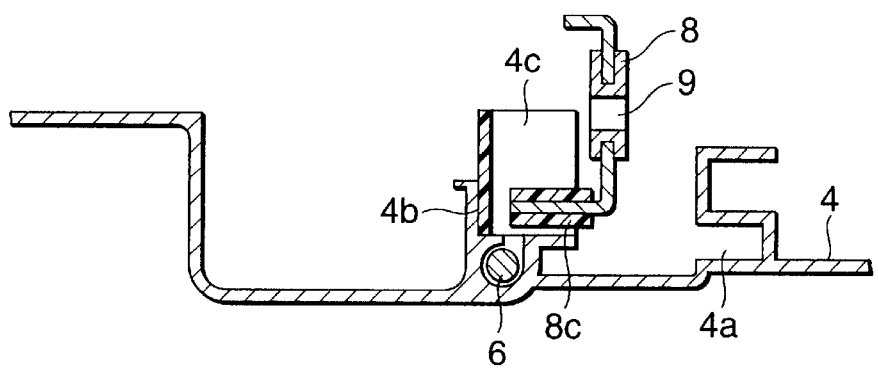
FIG. 5 is a section view taken along the line B—B shown in FIG. 3.
Figure 6:
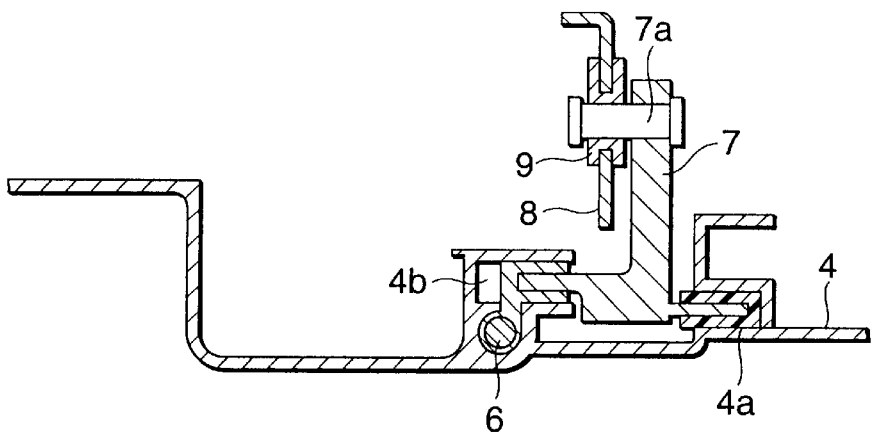
FIG. 6 is a section view taken along the line C—C shown in FIG. 2.
Figure 7:
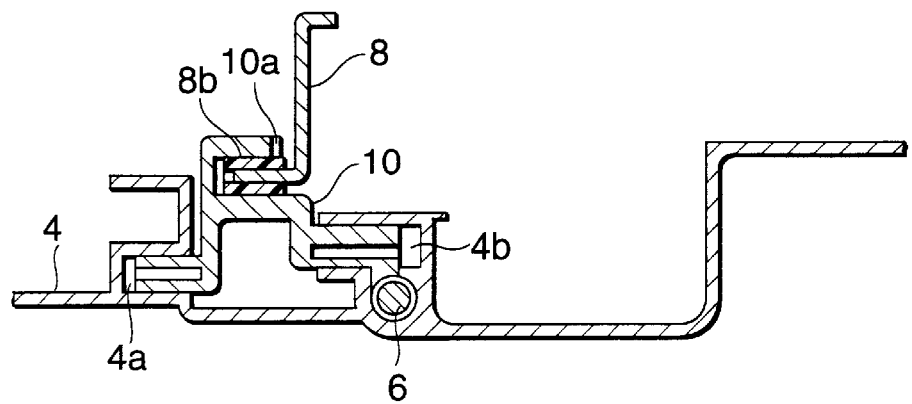
FIG. 7 is a section view taken along the line D—D shown in FIG. 1.

The guide rail (4), as shown in FIGS. 4 to 7, comprises two guide grooves (4a) and (4b) respectively formed on the right and left sides of the guide rail (4) and each having a U-shaped section, and a stopper groove (4c) which, as shown in FIGS. 1 to 3, is formed substantially at the center of the guide rail (4) in the longitudinal direction thereof and extends in the vertical direction, while the lower end of the stopper groove (4c) communicates with the guide groove (4b).

In FIG. 1, reference character (7) designates a drive shoe which is connected to the cables (6) and is slidablly fitted into the guide groove (4a) of the guide rail (4), and includes a guide in (7a) which is provided on and projected from the side surface of the upper end portion of the drive shoe (7). And, (8) stands for a pair of right and left guide members respectively fixed to the lower surface of the lid (1). Each of the guide members (8) includes: a guide groove (9) extending in the back-and-forth direction of the guide member 8; a front guide shoe (8a) which is disposed in the front lower portion of the guide member (8) and is fitted into the guide groove (4a) of the guide rail (4) in such a manner that it can be slided with respect to the guide groove (4a) and can be rotated right and left around the guide rail (4), while the upper and lower surfaces of the front guide shoe (8a) are respectively formed in an arc shape; a rear guide shoe (8b) disposed in the rear lower portion of the guide member (8), and a stopper shoe (8c) which, when the lid (1) is held in its fully closing state and in its tilt-up state, can be engaged with the stopper. groove (4c) of the guide rail (4) to thereby prevent the lid (1) from moving back and forth.

The guide groove (9) is almost turned up at their corners and includes, sequentially in the front-to-back order, a fully closing guide portion (9a) extending horizontally by a given amount in the back-and-forth direction of the guide groove (9), a tilt-up guide portion (9b) formed continuously with the rear end of the fully closing guide portion (9a) and extending backwardly in the obliquely downward direction, and a flap guide portion (9c) which is formed continuously with the rear end of the tilt-up guide portion (9b) and extends backwardly in the obliquely upward direction, while the rear end portion of the flap guide portion (9c) is situated higher than the fully closing guide portion (9a). And, (10) stands for a vertically restricting shoe which is connected to the cables (6) and can be moved back and forth along the guide rails (4) together with the cables (6). The vertically restricting shoe (10) includes a forwardly opened, U-shaped engaging portion (10a) which, when the lid (1) is situated at the fully closing position, can be engaged with the rear guide shoe (8b) from behind to thereby prevent the guide members (8) and lid (1) from moving in the upward and downward directions.

In the above-mentioned embodiment, as shown in FIG. 1, when the lid (1) is situated at the fully closing position, the guide pin (7a) of the drive shoe (7) stops at a position where it is contacted with the front end of the fully closing guide portion (9a) of the guide groove (9), thereby preventing the play of the drive shoe (7) and lid (1) in the back-and-forth direction thereof. Also, the engaging portion (10a) of the vertically restricting shoe (10) is engaged with the rear guide shoe (8b) of the guide member (8) to thereby restrict the upward and downward motion of the lid (1) and thus prevent the play of the lid (1).

In case where, from a state where the lid is situated at the fully closing position, the drive source is driven and rotated forwardly to thereby move the cables (6) backwardly, the drive shoe (7) and vertically restricting shoe (10) are respectively moved backwardly along the guide rails (4).

As shown in FIG. 2, the engaging portion (10a) of the vertically restricting shoe (10) is removed from the rear guide shoe (8b) and the guide pin (7a) of the drive shoe (7) is moved from the fully closing guide portion (9a) toward the tilt-up guide portion (9b) of the guide groove (9), whereby the lid (1) is rotated upwardly with the front guide shoe (8a) as the fulcrum thereof and is turned to the tilt-up position in which the rear end of the lid (1) is raised up from the surface of the roof (2). In this state, the stopper shoe (8c) is engaged with the stopper groove (4c) and is thus allowed to move only in the upward direction, thereby being able to restrict or prevent the back-and-forth movement of the lid (1).

In case where, from a state where the lid (1) is held in the tilt-up state, the drive source (5) is rotated further forwardly to thereby move the cables (6) backwardly, the guide pin (7a) is moved from the tilt-up guide portion (9b) to the flap guide portion (9c) of the guide groove (9), whereby the lid (1) is rotated downwardly with the front guide shoe (8a) as the fulcrum thereof so that the rear end of the lid (1) is lowered through the fully closing position down to a position lower than the upper surface of the roof (2) to thereby reach the flap position shown in FIG. 3. Almost at the same time with this, the stopper shoe (8c) is removed from the lower end of the stopper groove (4c) and is inserted into the guide groove (4b) ;and, after then, as the cables (6) are moved backwardly, the lid (1) reaches the fully opening position (not shown) where it can be stored in the storage portion located downwardly of the roof (2).

In case where the drive source (5) is rotated reversely from the fully closing state to thereby move the cables (6) forwardly, the lid (1), while remaining situated at the flap position, is moved forwardly together with the cables (6); and, as shown in FIG. 3, in case where the stopper shoe (8c) is contacted with the front edge surface of the lower end of the stopper groove (4c) to thereby prevent the forward movements of the guide members (8), at and after the time of such contact, only the drive shoe (7) is allowed to move forwardly, and thus the guide pin (7a) moves the guide groove (9) forwardly so that the guide pin (7a) is moved from the flap guide portion (9c) to the tilt-up guide portion (9b) of the guide groove (9), whereby the lid (1) is moved up to the tilt-up position.

In case where, from the tilt-up state, the drive source (5) is rotated further reversely to thereby move the cables (6) forwardly, the drive shoe (7) is moved further forwardly and the guide pin (7a) is moved from the tilt-up guide portion (9b) to the fully closing guide portion (9a), whereby the lid (1) is returned back to the fully closing position. And, in case where the cables (6) are moved forwardly further from this state, not only the engaging portion (10a) of the vertically restricting shoe (10) is engaged with the rear guide shoe (8b) but also the guide pin (7a) of the drive shoe (7) is contacted with the front end of the fully closing guide portion (9a) of the guide groove (9), whereby the lid (1) is returned back to its original state shown in FIG. 1.

According to the present invention, there can be obtained the following effects.

(a) According to a first aspect of the invention, when the lid is situated at the fully closing position, the guide pin of the drive shoe is contacted with the front end of the guide groove of the guide member and is thus standing still, which not only can positively prevent the playing motion of the drive shoe and lid but also can positively stop and hold the drive shoe in the fully closing state.

(b) According to a second aspect of the invention, simply by forming a single guide groove in the guide member, the lid can be moved as desired, which makes it possible to simplify the structure of the present sunroof device.

(c) According to a third aspect of the invention, when the lid is situated at the fully closing position and tilt-up position, the guide member is engaged with the stopper groove and is thereby prevented from moving back and forth, which can prevent the lid from playing back and forth.

(d) According to a fourth aspect of the invention, when the lid is situated at the fully closing position, the rear end of the guide member is engaged with the vertically restricting shoe and is thereby prevented from moving in the vertical direction, which can positively prevent the lid from playing in the vertical direction.

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. A sunroof apparatus comprising:
   a pair of guide rails respectively disposed on two sides of an opening formed in a roof of a vehicle body;
   a drive shoe connected through a cable to a drive source, said drive shoe being slidably fitted with said guide rail;
   a lid for opening and closing said opening;
   a guide member provided on said lid and having a guide groove; and
   a guide pin provided on and projected from said drive shoe, said guide pin being movably engaged with said guide groove,
   wherein when said drive source is operated, said drive shoe is moved along said guide rail and said guide pin is moved within said guide groove, whereby said lid can be moved to (i) a fully closing position where said lid closes said opening, (ii) a tilt-up position where a rear end of said lid is raised upwardly of said roof, and (iii) a flap position where the rear end of said lid is lowered downwardly of said roof, and
   wherein, when said lid is situated at the fully closing position, said guide pin of said drive shoe is contacted with a front end of said guide groove and, from this state, as said drive source is driven and rotated, said guide pin is moved backwardly from the front end of said guide groove so that said lid can be moved sequentially to the fully closing position, the tilt-up position and the flap position in order.

2. A sunroof apparatus according to claim 1, wherein said guide groove of said guide member includes a fully closing guide portion formed in a front portion of said guide groove and extending substantial horizontally, a tilt-up guide portion formed continuously with a rear end of said fully closing guide portion and extending downwardly in a backward direction of said guide groove, and a flap guide portion formed continuously with a rear end of said tilt-up guide portion and extending upwardly in the backward direction of said guide groove, a rear end portion of said flap guide portion being positioned upwardly of said fully closing guide portion.

3. A sunroof apparatus according to claim 1, further comprising:
   a stopper groove respectively formed in said guide rail and extending in a vertical direction; and
   a stopper shoe provided at an intermediate portion of said guide member in a longitudinal direction thereof, said stopper shoe being engaged with said stopper groove when said lid is held at the fully closing position and the tilt-up position to be thereby prevented from moving back and forth.

4. A sunroof apparatus according to claim 2, further comprising:

a stopper groove respectively formed in said guide rail and extending in a vertical direction; and a stopper shoe provided at an intermediate portion of said guide member in a longitudinal direction thereof, said stopper shoe being engaged with said stopper groove when said lid is held at the fully closing position and the tilt-up position to be thereby prevented from moving back and forth.

5. A sunroof apparatus according to claim 1, further comprising:

a rear guide shoe disposed in a rear portion of said guide member; and a vertically restricting shoe being connected to said cable and movably fitted with said guide rail at a rear position of said drive shoe, said vertically restricting shoe being engaged with said rear guide shoe when said lid is held at the fully closing position to thereby prevent a vertical movement of said lid.

6. A sunroof apparatus according to claim 2, further comprising:

a rear guide shoe disposed in a rear portion of said guide member; and a vertically restricting shoe being connected to said cable and movably fitted with said guide rail at a rear position of said drive shoe, said vertically restricting shoe being engaged with said rear guide shoe when said lid is held at the fully closing position to thereby prevent a vertical movement of said lid.

7. A sunroof apparatus according to claim 3, further comprising:

a rear guide shoe disposed in a rear portion of said guide member; and a vertically restricting shoe being connected to said cable and movably fitted with said guide rail at a rear position of said drive shoe, said vertically restricting shoe being engaged with said rear guide shoe when said lid is held at the fully closing position to thereby prevent a vertical movement of said lid.

8. A sunroof apparatus according to claim 4, further comprising:

a rear guide shoe disposed in a rear portion of said guide member; and a vertically restricting shoe being connected to said cable and movably fitted with said guide rail at a rear position of said drive shoe, said vertically restricting shoe being engaged with said rear guide shoe when said lid is held at the fully closing position to thereby prevent a vertical movement of said lid.

* * * * *